United States Patent [19]

Cook et al.

[11] Patent Number: 4,661,310
[45] Date of Patent: Apr. 28, 1987

[54] PULSED MULTICHANNEL PROTECTION SYSTEM WITH SATURABLE CORE MAGNETIC LOGIC UNITS

[75] Inventors: Bruce M. Cook; Jerzy Gutman, both of Plum Borough, Pa.

[73] Assignee: Westinghouse Electric Corp, Pittsburgh, Pa.

[21] Appl. No.: 546,604

[22] Filed: Oct. 27, 1983

[51] Int. Cl.$^4$ .............................................. G21C 17/00
[52] U.S. Cl. .................................. 376/259; 376/215; 376/254; 371/36; 364/184; 364/187
[58] Field of Search ............... 376/254, 255, 259, 215; 371/36; 364/184–187; 328/71, 147, 148

[56] References Cited

U.S. PATENT DOCUMENTS 4,054,486 11/1977 Lefebvre et al. .................... 376/215
4,338,650 7/1982 Wierschke et al. .
4,434,132 2/1984 Cook .................................. 376/259

FOREIGN PATENT DOCUMENTS 2494034 11/1981 France .

OTHER PUBLICATIONS

Guterman et al., "Logical and Control Functions Performed with Magnetic Cores", Proc. IRE 1955, pp. 291–298.
Gianola et al., "The Laddic—A Magnetic Device for Performing Logic", Bell Sys. Tech. J., Jan. 1959, pp. 45–72.
GEC-Elliot Process Automation LTD, "Collected Information on Safety Systems Supplied by GEC-Elliot Process Automation LTD" (2/7/71), pp. 1–46.

Primary Examiner—Salvatore Cangialosi
Attorney, Agent, or Firm—Daniel C. Abeles

[57] ABSTRACT

The dynamic logic of each channel of a multichannel protection system for a nuclear power plant provides a trip logic path and a global bypass logic path by which pulse signals from a clock source may be transmitted to a dc-to-dc power converter which energizes the undervoltage coils for a pair of contactors in the reactor trip switchgear. Each of the logic paths is constructed of basic logic units which in turn, each include a toroidal core of rectangular hysteresis loop magnetic material having a control winding which must be energized by a dc current in order for pulses applied to an input winding to appear at an output winding. Blockage of pulses through any one of the serially connected basic logic units in a logic path terminates the flow of pulses to the converter through that logic path. The control windings of corresponding logic units of the trip logic path in each channel are energized by one of a set of redundant sensors which monitor one of a plurality of reactor trip parameters. Dynamic voting logic appropriate for existing conditions is implemented in part by microprocessors in each channel which gather status information from the other channels through isolated, fiber optic, multiplexed data links and provide the switching logic for alternate paths for energization of the individual basic logic unit control windings, so that for instance, coincidence of trip signals from corresponding sensors in at least two out of four unbypassed channels is required to trip the reactor switchgear. Local bypasses provide additional energization paths for the control windings of basic logic units associated with sensors which are out of service or being repaired. Pulses propagate through the basic logic units of the global bypass path when an entire channel is taken out of service for treating or maintenance. Interlocks between logic units in the trip logic and global bypass logic paths permit only one path to deliver pulses to the converter at any given instant.

21 Claims, 7 Drawing Figures

PULSED MULTICHANNEL PROTECTION SYSTEM WITH SATURABLE CORE MAGNETIC LOGIC UNITS

BACKGROUND OF THE INVENTION

1. Field of the Invention:

This invention is related to highly reliable, redundant channel protection systems for complex closely controlled processes and is particularly suitable for an integrated protection system for a nuclear power plant. More particularly, it is directed to a fail-safe, multichannel protection system which utilizes rectangular hysteresis loop magnetic core logic units controlled by the monitored parameters to gate pulsed signals to converters which energize the undervoltage coils of the reactor trip switch-gear with voting logic between redundant channels being modified by bypasses to accommodate for failed sensors or the removal of an entire channel from service for testing or maintenance.

2. Description of the Prior Art:

Many industrial and commercial processes require close monitoring and rapid, reliable response to deviations from established criteria for an array of process parameters. The protection systems which carry out these functions must be reliable and fail-safe but must also be resistant to spurious responses to avoid costly down time. Nowhere is the need for a dependable protection system more essential than in a nuclear power plant. In such a plant, a large number of parameters must be continuously monitored to assure that conditions remain within specified operating limitations. Deviations from certain of the established criteria require that the reactor be immediately shutdown. Shutdown or tripping of the reactor is accomplished by removing power from mechanisms holding control rods above the reactor core so that the rods fall by gravity into the core where they absorb sufficient neutrons to lower the reactivity to the subcritical level. Regulations for the operation of nuclear power plants require that the protection system meet the single failure criterion under which the reactor must be tripped in response to deviations from any of the specified operating limitations despite the existence of any possible single failure in the protection system.

Since the advent of commercial nuclear reactors, it has been the practice to provide redundant sensors, and where required, signal processors, for the critical parameters, and to utilize the signals thus generated in separate protection channels or actuation trains. Typically, a set of four signals is generated for each parameter, with one signal from each set being utilized in one of four protection channels. Thus, each protection channel incorporates a signal representative of the state of each of the monitored parameters, any one of which can generate a trip signal in that channel. The redundant channels provide reliability, however, in order to reduce the occurrence of spurious trips, coincidence of trip signals in the same set in more than one channel is required to trip the reactor. Typically, the coincidence of two out of four signals in a set, in other words, two of the channels, is required to remove power from the control rod actuators. The two out of four voting logic is carried out by the arrangement of the trip breakers which control the flow of electric power to the control rod actuators and by tie-ins between channels which assure that the trip signals in the two channels are from the same set. Since a trip signal is required in more than one channel to trip the reactor, the trip signal generated by an individual sensor is referred to as a partial trip signal.

At times, a sensor in a set will fail and in some instances cannot be repaired until the reactor is shut down. In addition, regulations require that various components of the protection system be tested periodically. In many of the prior art protection systems, a failed sensor or a sensor taken out of service for maintenance or test generates a trip signal in the associated protection channel. This trip in one channel caused by an out of service sensor reduces the protection system from a two out of four voting system to a one out of three system, and therefore, reduces the availability of the system by subjecting it to a greater likelihood of a spurious trip caused by a failure or transient in only one other channel.

The protection system described in commonly owned U.S. patent application Ser. No. 252,515 entitled "Power Supply With Nuclear Reactor" and filed on Apr. 9, 1981 in the name of Bruce M. Cook avoids these problems by bypassing the signals generated by the affected sensors. Two types of bypasses are provided. The channel level or local bypass bypasses in the appropriate channel the logic module associated with the sensor which has failed or has been taken out of service for maintenance. The remainder of that channel is not affected and a trip signal can be generated by it in response to an abnormal condition detected by any of the other sensors associated with that channel. The second type of bypass is the global bypass which bypasses the entire channel to prevent actuation of the trip breakers associated with that channel when the channel is taken out of service for maintenance or testing. The occurrence of a local bypass modifies the voting logic in the channels to two out of three of the remaining channels in the case of one bypass and to one out of two where two logic modules in a set are bypassed. If an attempt is made to bypass the logic modules associated with three sensors in a set, a trip is generated. This modification in the voting logic is carried out by microprocessors associated with each channel.

The trip and bypass status of each of the logic modules associated with each monitored parameter in each channel is communicated between channels by fiber optics, multiplexed data links which also provide electrical isolation between channels. The appropriate voting logic for each of the monitored parameters in each channel is bypass status of each channel is also transmitted to microprocessors in the other channels by the isolated, multiplexed data links. Since the reactor trip breakers are arranged in a matrix so that a trip signal from any two channels removes power from the control rod actuators, the first global bypass need do nothing more than block any trip signal from the bypassed channel and the system reverts to two out of three voting logic on the remaining channels. Bypassing of a second channel by a global bypass opens the trip breakers associated with the second channel to initiate one out of two voting logic on the remaining two channels. If an attempt is made to bypass a third channel, the opening of the associated reactor trip breakers in addition to those already opened by the second global bypass results in tripping of the reactor.

The trip breakers through which current flows to hold the control rods in the retracted position are held in the closed position by undervoltage coils on the switchgear. Deenergization of these undervoltage coils results in opening of the associated trip breakers. In the system described in the above identified patent application, the undervoltage coils are energized through an output transistor in the associated protection channel. The output transistor is held on by the channel trip bus which normally "floats" at the d-c logic voltage. However, the channel trip bus can be pulled down to ground potential by any of the channel logic units to thereby turn off the output transistor and open the associated reactor trip switchgear. In this system, the logic units comprise either relays or solid state switches. While this system is very effective for detecting failures, there are some limitations. Most notably, a short circuit failure in the output transistor or a build-up of film on the relay contacts could prevent a trip.

Toroidal cores of magnetic material having a rectangular hysteresis loop characteristic have been widely used as memory and switching elements in logic circuitry. In addition, a specialized form of such a "square loop" device called a Laddic is used in some nuclear power plant protection systems. The Laddic is a ladder-like structure cut out of the rectangular hysteresis loop material having an input winding on the first rung and an output winding on the last rung. Starting with a suitable saturation flux pattern which is induced by a current pulse applied through a reset winding on one of the side rails of the ladder structure, a drive pulse applied to the input winding so as to switch flux in the first rung will switch the flux almost entirely through the closest available rung rather than split it among all available rungs. Thus, normally there is no change in flux and thus no output in the last rung of the ladder which carries the output winding. However, if inhibiting fields produced by current pulses are applied to all of the rungs intervening between the input and output rungs, the switched flux must return through the output rung and an output pulse will be obtained. In this protection system, a clock pulse is applied to the input rung of the Laddic and the signals representing the trip status of the selected parameters are the input variables applied to the intermediate rungs of the ladder. If none of the parameters are in an abnormal state so that all of the alternate paths are blocked, a pulse is generated in the output. By repetitively resetting the flux pattern with the reset pulses and reapplying the clock pulses, a continuous pulse signal is generated at the output. This pulse signal is applied to a converter which produces a d-c output of sufficient voltage to maintain the undervoltage coils of the reactor trip switchgear energized. If any of the monitored parameters are in the trip state, the switching pulses cease to trip the reactor trip breakers. In this arrangement, each Laddic forms a channel of a multichannel system with the two out of three voting logic being accomplished by additional windings on the intervening rungs to which signals from the other sensors in the set are applied. In some systems employing Laddics, two out of four voting logic is achieved by use of an arrangement including additional Laddic devices.

While the protection system utilizing Laddics has the advantage that transmission through a protection channel of a pulse signal is required to prevent tripping of the reactor so that a failure which causes a d-c signal will not prevent a trip, it still has some unacceptable failure modes. For instance, certain cracks in the ladder lattice can prevent a trip and certain failures in the converter could mask a trip command where reset pulses were still being applied to the converter. Furthermore, the multichannel Laddic protection system lacks electrical isolation between channels and has no means for implementing the bypass logic described above but rather reverts to one out of three voting logic when a sensor fails, both of which adversely affect the availability of the system.

SUMMARY OF THE INVENTION

According to the present invention, a protection system for process apparatus propagates a clock pulse signal through logic means to an output device which responds according to whether it receives or does not receive the pulse signal. The logic means includes core means of rectangular hysteresis loop magnetic material with input, output and control winding means all wound on the core. A number of sensors which monitor selected process parameters are connected to the control winding means so as to block the flow of pulses through the logic means if any of the monitored parameters are out of limits. Thus, for instance, in the case of a nuclear power plant where the sensors would monitor reactor trip parameters, the generation of a trip signal by any of the sensors would interrupt the flow of pulses to the output means which would actuate the reactor trip switchgear. The invention also encompasses the provision of an alternate, parallel path for the clock pulses so that the output device can receive pulses even though a signal from one of the sensors may be blocking the flow of pulses through the logic means. This alternate path is referred to as the global bypass path since it bypasses the entire logic means. Local bypasses for the individual sensor signals are also provided within the logic means.

According to the best mode of the invention, the logic means is a plurality of individual logic units each of which has a core of rectangular hysteresis loop magnetic material wound with an input winding, an output winding, and a control winding. With a d-c current applied to the control winding of sufficient magnitude to saturate the core in one direction, pulses applied to the input winding of sufficient magnitude to overcome the magnetic flux caused by the control winding and to saturate the core in the opposite direction, generate pulses on the output winding. The absence of a d-c current on the control winding results in the core remaining saturated in the second direction to block pulses applied to the input winding from appearing on the output winding.

The individual logic units are arranged in a series with the input winding on each successive unit connected to the output of the preceding unit. A partial trip signal from one of the sensors controls a switch which supplies current to the control winding of each of the logic units. The local bypass means includes a switch in parallel with the switch controlled by the sensor so that even if the sensor controlled switch is open because the monitored parameter is out of limits, current is supplied to the control winding through the local bypass controlled switch and pulses continue to be outputted by the logic unit. This permits bypassing of a faulty sensor without eliminating the protection afforded by the other sensors controlling the other logic units in the train.

Each logic unit preferably includes a pulse discriminator-shaper connected to the output winding which is responsive only to pulses generated by a change in flux in the magnetic core from saturation in either direction to saturation in the other direction for more reliable response. It also shapes the pulses into an output pulse having a magnitude, duration and shape similar to that of the pulse applied to the input winding. In this manner, a pulse signal similar to that applied by the clock to the first logic unit in the series is propagated through the train of logic units.

The train of logic units together with the global bypass and output means form a channel, and preferably a plurality of such channels are provided for redundancy. Redundant sensors control the flow of d-c current in the control windings of corresponding logic units in each channel. The global bypass means in each channel, which bypasses the entire channel, is preferably constructed of the same basic logic units. One such logic unit controls the flow of pulses in the parallel path from the clock to the output means and a second blocks the flow of pulses from the train of logic units to the output means when the global bypass is in effect. A third logic unit in series with the first in the global bypass path has its control winding current controlled by computing means which gathers information from the other channels and blocks the flow of pulses from the clock to the output means thorough the global bypass path if a global bypass is already in effect in another channel.

The computing means also gathers information on partial trips and local bypasses in all the other channels in addition to the global bypasses and generates a trip enable signal for each of the logic units in the train. The trip enable signal controls a switch in parallel with the switch controlled by the sensor associated with each logic unit so that a partial trip signal generated by the sensor is only effective to terminate current flow in the control winding and block the propagation of pulses through the logic train if the trip enable signal is present. This trip enable signal incorporates the voting logic which takes into account by the state of the logic units in all of the channels.

The output means is a dc-to-dc power converter which generates a level d-c signal to response to an applied pulse signal. Preferably, the converter is a buck-boost, flyback dc-to-dc converter which in the case of the nuclear power plant, generates an output voltage of sufficient magnitude to energize the undervoltage coils on the reactor trip switchgear. In the absence of pulses on the input to the converter, the output drops to zero and the switchgear trips the reactor.

The process apparatus protection system of this invention is very reliable and is highly resistant to spurious responses. Its reliance on dynamic principles in which logic levels are represented by the presence or absence of current pulses provides protection against faults which cause hard d-c levels. The magnetic logic units have no moving parts and tests have shown that no postulated failure of these units prevents a trip output although many failures result in a trip.

DESCRIPTION OF THE PREFERRED EMBODIMENT

Figure 1:
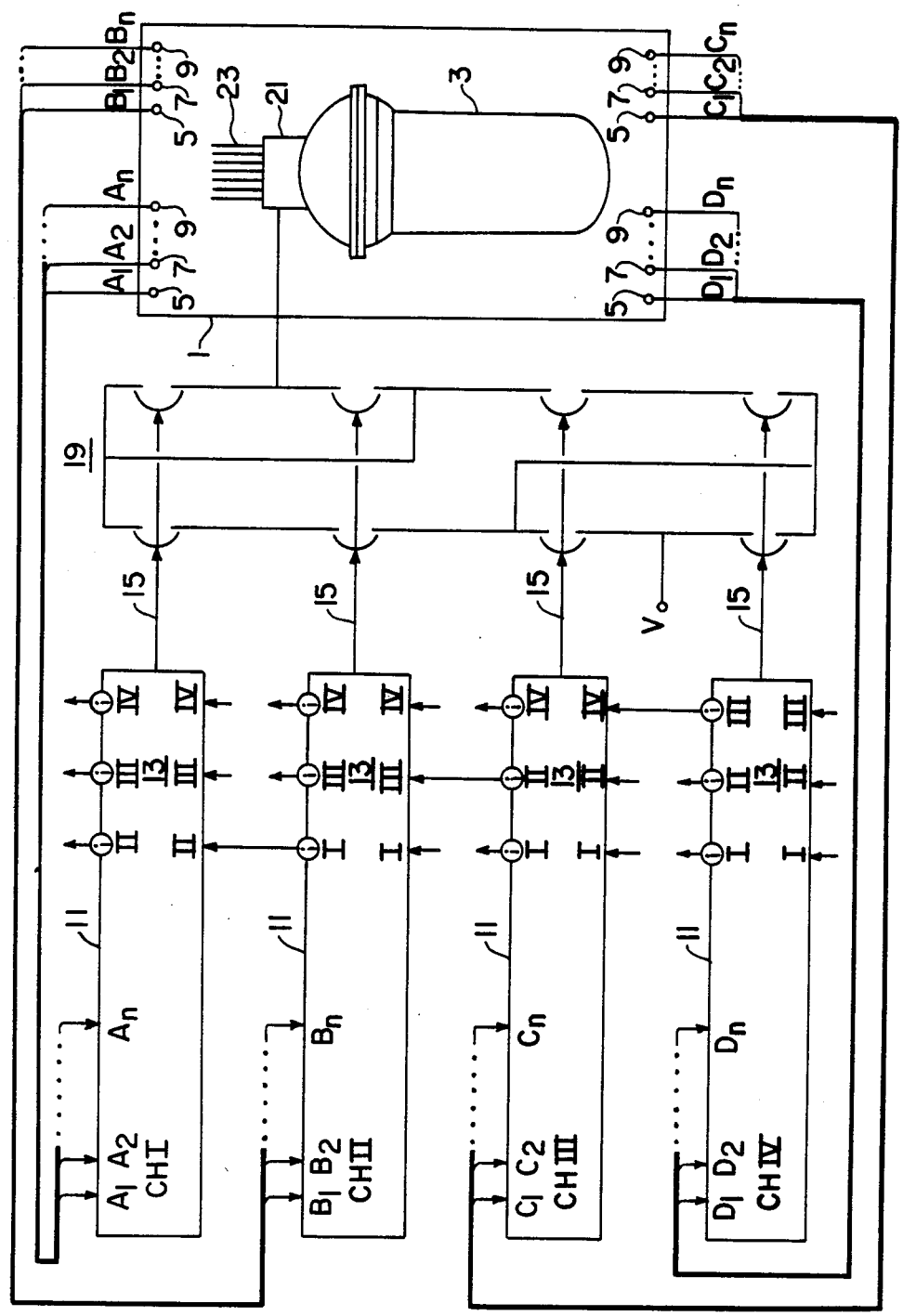
FIG. 1 is a schematic diagram of a four channel protection system for a nuclear power plant which incorporates the present invention.

The invention will be described as applied to a protection system for a nuclear power plant but it should be appreciated that the invention is also applicable to protection systems for other types of complex process apparatus where a reliable, fail-safe protection system with high availability is desired. The nuclear power plant which is depicted schematically in FIG. 1 by the block 1 contains a nuclear reactor 3. The reactor 3 produces through nuclear fission reactions thermal energy which is utilized to generate electricity through a turbine-generator combination (not explicitly shown). Operation of the reactor 3 and its associated components is closely moinitored and the reactor is shutdown, or tripped, if certain carefully selected operating limitations are exceeded. A large number of system parameters are monitored in order to assure that operation remains within the selected limits. In a pressurized water reactor (PWR) these parameters include, for example, such measurements as reactor neutron flux, reactor coolant temperature, pressurizer level and pressure, and steam generator pressure and feedwater flow in addition to status indications such as whether a switch is opened or closed or whether a pump is off or on. Some monitored parameters such as departure from nucleant boiling in the PWR are calculated from measured parameters.

The various measured and status parameters are monitored by sensors placed throughout the plant. For reliability, redundant, typically four, sensors are provided for each parameter. These redundant sensors form a set such as the sets 5, 7 and 9 in FIG. 1. One sensor signal from each set of all of the monitored parameters is applied to one of the four Roman numeral identified channels I to IV of the protection system through cabling 19. Where appropriate, the sensor signals are compared with selected set points in processors not shown in FIG. 1 so that all the signals $A_1$, $A_2$, to $A_n$, $B_1$, $B_2$ to $B_n$ et cetera applied to the protection system channels are partial trip signals which are high if the mointored parameters is within limits and low if out of limits.

The partial trip signals such as $A_1$ through $A_n$ are logically ORed in each channel. Local bypasses of the individual sensors or global bypasses which bypass the partial trip logic of the channel entirely are also selectively applied within each channel, all in a manner to be discussed in more detail below. The statuses of each partial trip signal, each local bypass, and the global bypass of each channel are communicated to each other channel by electrically isolated, fiber optic, multiplexed data links 13. Based upon all of this information, each channel generates an output 15 which controls the opening and closing of a pair of contactors 17 in the reactor trip switchgear 19.

The pairs of contactors 17 in the reactor trip switchgear 19 are arranged in an array such that electric power from a source V will be continuously applied to control rod actuators 21 on the reactor 3 unless at least two paris of contactors 17 are opened by the associated protection channel. This arrangement of switchgear contactors participates in the two out of four voting logic by which the reactor is tripped when two out of four of the protection channels indicate the necessity for a trip, however, as will be seen, logic within the channels ensures that there is a coincidence of parameters generating trip signals in the two channels so that the reactor does not trip on two random signals. The channel logic also modifies the voting logic based upon the bypasses in effect. Removal of power from the control rod actuators 21 permits control rods 23 to drop by gravity down into the reactor 3 where they absorb sufficient neutrons to reduce the reactivity below the critical level thereby shutting down the reactor.

Figure 2:
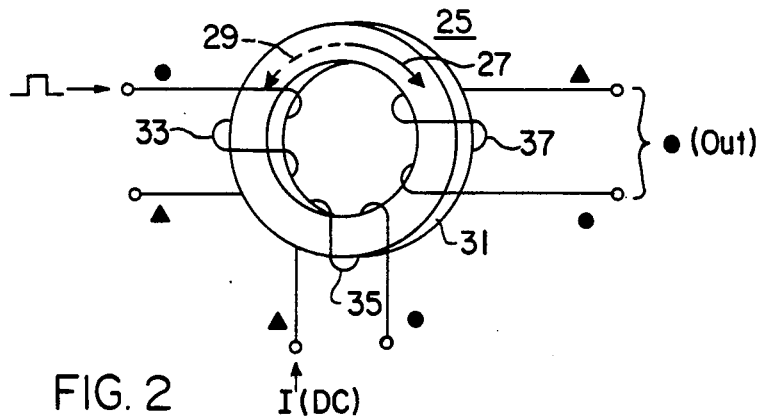
FIG. 2 is a schematic drawing of a magnetic switching device in accordance with the teachings of the invention.

Each of the protection channels 11 incorporates a number of basic logic units which in turn each contain a fundamental logic element 25 shown in FIG. 2. The operation of this fundamental logic element is based on flux reversals in tape wound toroidal cores made of "square loop" magnetic material. As shown by the arrows 27 and 29 in FIG. 2, this material can be magnetized in either of two directions. The fundamental logic element 25 consists of a single core, 31, that has three windings: an input winding, 33; a d-c control winding, 35; and an output winding, 37. The winding terminals marked by o in FIG. 2 indicate the polarity of the windings. Under the convention used for indicating polarity, current flowing into the o terminal causes a magnetic flux to be induced in the clockwise direction of the core 27.

Figure 3:
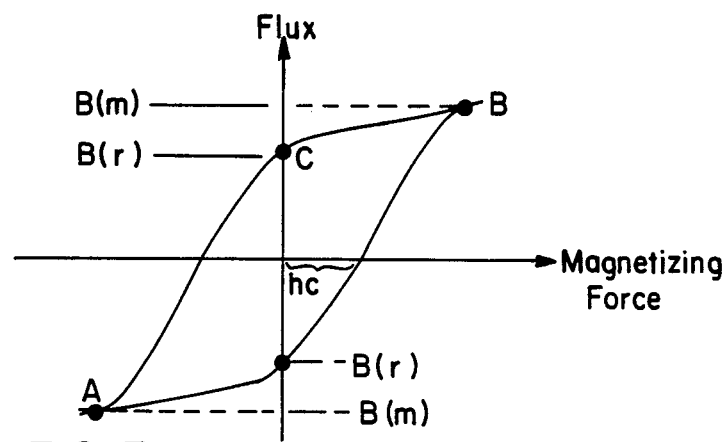
FIG. 3 is a diagram illustrating the rectangular hysteresis loop characteristics of the core of the magnetic switching device illustrated in FIG. 2.

The hysteresis curve for a typical square loop material is shown in FIG. 3. Three parameters of this curve are important to the operation of the core 31 as a dynamic logic element. Those are the maximum (saturation) magnetic flux, B(m); the residual flux B(r); and the "Coercive force", hc, which is the driving magnetizing force required to switch the core. The fact that a residual flux will remain in the material after the magnetizing force has been removed is paramount to the operation of the device as a logic element. This residual flux, along with the hysteresis of the material, defines two stable states: the clockwise 27 and anti-clockwise 29 flux states shown in FIG. 2. In normal operation, a d-c current flows into the ▲ terminal of the winding 35 with sufficient magnitude to saturate the core, 31, in the negative (anti-clockwise) direction 29. This causes the magnetic material of the core to be at operating point a in FIG. 3. When a current pulse is impressed into the ● terminal of winding 33 with a sufficient magnitude to overcome both the magnetizing force generated by the d-c current in winding 35 and the coercive force, hc, then the core, 31 will switch into the clockwise flux state 27, eventually reaching operating point B.

Figure 4:
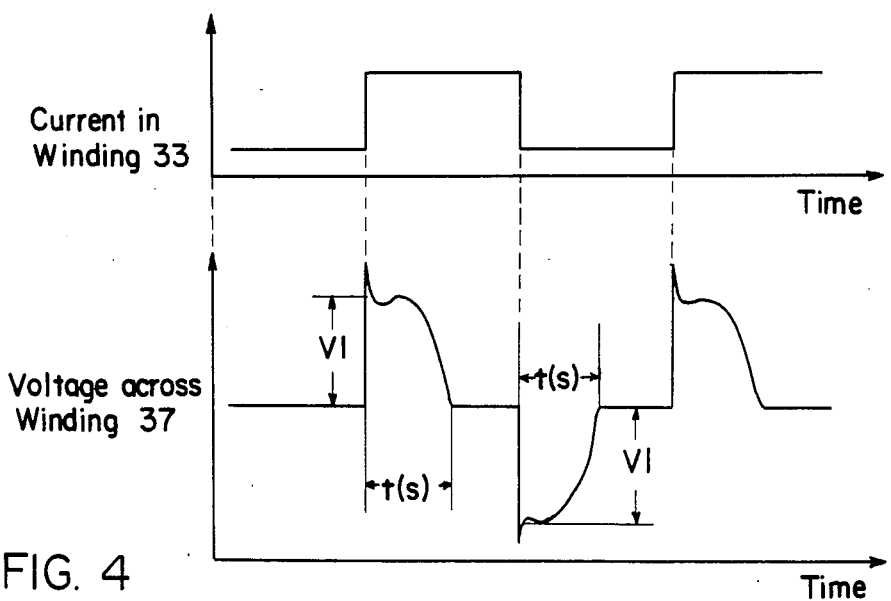
FIG. 4 is a diagram illustrating the relationship between a rectangular input pulse applied to the switch of FIG. 2 and the output generated thereby.

This change of the flux state of the core induces a voltage pulse, e(out), across winding 37 which is a function of the specific magnetic material chosen, the thickness of the tape used to wind the core and the magnitude of the magnetizing force impressed upon the core. The ouptut pulse amplitude, V1, is proportional to the saturation flux, B(m), of the magnetic material and the number of turns in the winding 37, and inversely proportional to the pulse width, or the switching time of the core. When the current pulse is removed from winding 33, the magnetizing force of the d-c current in control winding 35 once again takes over and causes the core to switch back to the operating point B, again causing a voltage pulse to be induced across the output winding 37, but this time of the opposite polarity. This relationship of input to output is shown in FIG. 4. The pulses are impressed into winding 33 in a periodic fashion, thus generating a continuous stream of alternating voltage pulses at the output winding 37. If during this operation, the d-c current in the control winding 35 is removed, then the core will not switch back to operating point A when the current pulse is removed form winding 33, rather, the magnetic material of the core will return to the positive residual state, operating point C in FIG. 3. Subsequent current pulses cause the flux to change only from $+B(r)$ to $+B(m)$, therefore the magnitude of the output pulses at winding 37 is substantially smaller than before when the flux was changing between $-B(m)$ and $+B(m)$. Because the core arrived at point C through point B, the last large output pulse will always be positive. If instead of removing the d-c current in control winding 35, the current pulses in the input winding 33 are removed, two cases must be considered, no current in winding 33 and continuous d-c current in 33. In the first case, the core will be reset to point A by the current in the control winding 35 and a final negative output will be generated. In the second case, the core will always remain at the operating point B and the last output pulse is positive. In either case, the core flux will remain invariant and no further output pulses of any magnitude will be generated.

In addition to the magnetic coupling described, there is capacitive coupling between the input and output windings of the core. This capacitance, which is extremely dependent on the specific size and geometry of the core and the windings used but was measured to be 35pF in a sample element, works against the "switching" action of the core because the sharp edges of the input current are differentiated by the capacitance to produce voltage spikes on the output that are not controlled by the d-c current in the control winding. It was found, however, that these spikes were sufficiently narrow, 1 to 2 microseconds, to be discriminated from the wider switching pulse by a simple RC filter. Thus by the operation described above, pulses are gated through the core by d-c current present in winding 35 and blocked if the current in winding 35 is removed. This principle forms the basis for implementing the Reactor Trip Logic System.

As mentioned previously, the fundamental logic element 25 of FIG. 2 is a component of basic logic units which form the building blocks for each of the protection channels 11. In such a basic logic unit 39 shown in FIG. 5, the fundamental logic element 25 serves as a switch to which an input stream of current pulses is applied through input winding 33. Current through the control winding 35 is controlled by control circuit 41. When control current is present on winding 35 to core experiences flux reversals and pulses appear across the output winding 37. If there is no current in the control winding, then the pulses are blocked. As explained above, the output pulses from the fundamental logic element 25 are not the same shape as the square input pulses, rather, they are pulses of a given width that are "triggered" by the edges of the input pulse and are either positive or negative depending upon whether the edge was rising or falling.

Since it is desirable to retain the exact shape of the input pulse at the output of the switch 25, the ouptut winding 37 is connected to a pulse "discriminator-shaper" 43 that is capable of differentiating between the large output pulses that are present when the switch is closed (current flowing in the control winding) and the very small pulses present when the switch is open, and of reshaping the output to resemble the input. The principle of operation of this stage is that of a "Schmitt Trigger" or bistable with hysteresis. This device is "set" by the positive going pulse and "reset" by the negative. The thresholds provided by the hysteresis provide noise immunity and the ability to act on large pulses while ignoring small pulses. Operational amplifier circuits with positive feedback had been considered to implement this block. These offer the advantage of allowing the switching threshold to be very accurately controlled. However, it was discovered that because of imbalances between the rising and falling slew rates of the operational amplifier used, the input pulse width was not preserved. In other words, there was a small delay associated with turning the op-amp on but no delay in turning it off. The result was that the square input pulse lead to an output pulse of a lesser duty cycle and after a few logic stages, the pulse disappeared altogether. Operational amplifiers with balanced rise and fall times generally require dual power supplies. While such an arrangement could be used, it was felt that this requirement would complicate the design and would unduly affect the reliability of the logic function. Therefore, an alternative circuit based on CMOS logic gates was investigated. This circuit is shown inside the block 43. It is basically two CMOS NOR gates 45 cross coupled to form an R-S flip flop. A pulse at the set input "S" causes the ouptut to go to the high state while a pulse at the reset input "R" causes the output to go low. These pulses are provided by the alternating polarity pulses that appear at the output of the core switch element 25. The two diodes 47 connected from the gate inputs to ground perform the function of referencing the pulses to ground by conducting in the forward direction.

In order for this circuit 43 to function properly, two considerations are important. First, the voltage level of the pulses coming from the core 31 must be sufficiently greater than the threshold of the CMOS gates. This threshold is nominally one half of the supply voltage. The second consideration concerns the spikes that are present when the core 31 is off (blocking) due to the capacitive coupling of the windings. To prevent these spikes from switching the gates, a low-pass RC filter 49 is provided at the input to each gate. The time constant of these filters 49 is such as to reduce the amplitude of the spikes while at the same time not detrimentally reducing the amplitude of the wider pulses that appear when the core 31 is undergoing flux reversals. It was decided to set the filter time constant to be approximately one half of the pulse width.

Figure 5:
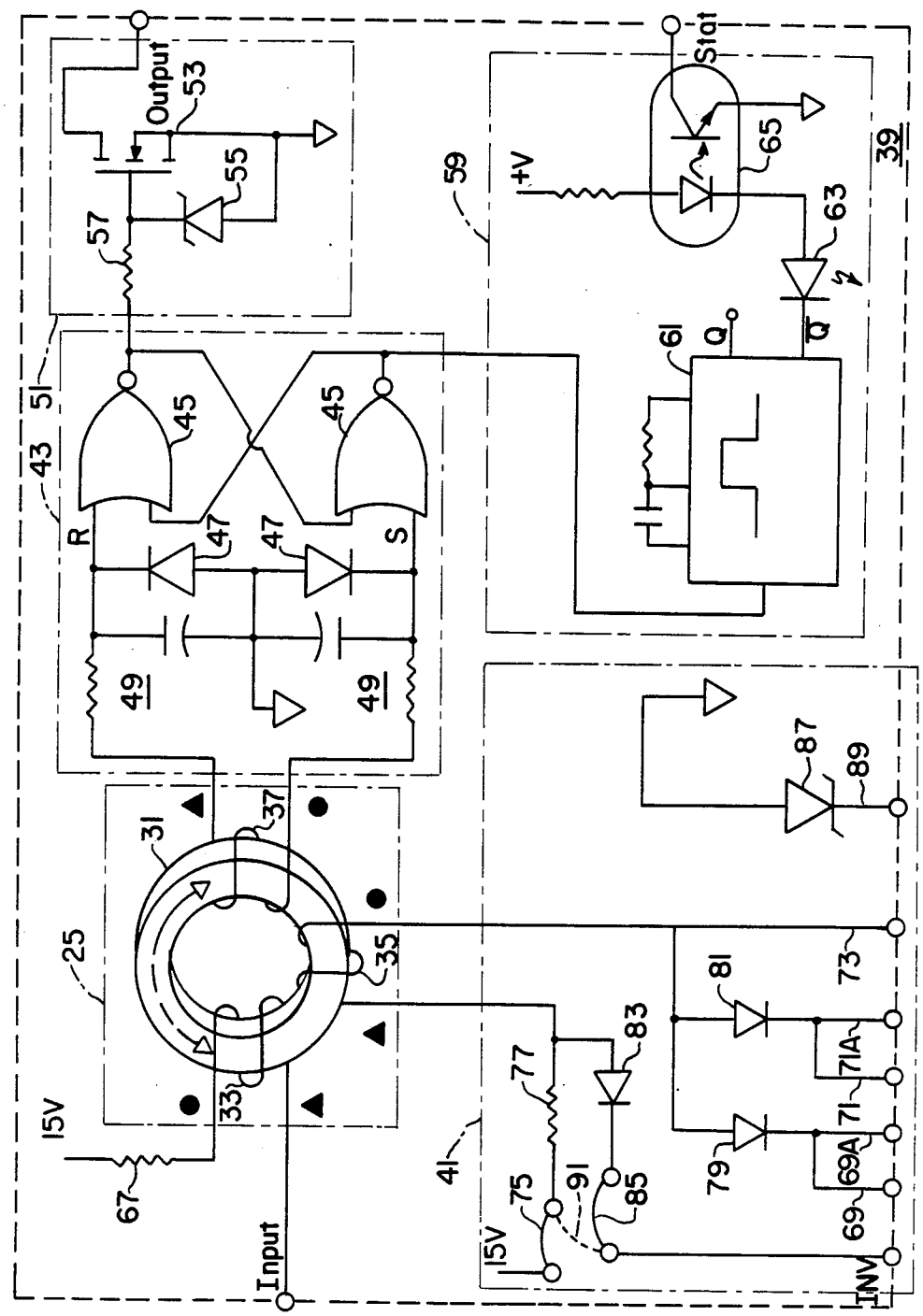
FIG. 5 is a schematic diagram of a basic logic unit according to the invention which incorporates the switch of FIG. 2.

The next block of the Basic Logic Unit 39 shown in FIG. 5 is a current amplifier 51. This amplifier must take the output of the discriminator stage and amplify it to provide sufficient current to drive the input coil of the succeeding logic unit. The simplest form of this amplifier is a single transistor connected in a common emitter circuit. While a bipolar transistor could be used, a MOSFET 53 is particularly well suited for this application because it can be directly driven by the CMOS logic gates. The gate voltage required for saturation of the MOSFET 53 is approximately 6 volts, thus this voltage will be taken as the supply voltage of the CMOS gates 45. Therefore, the output winding of the core 31 and the low-pass filter 49 must be designed to provide pulses that are suffciently greater than 3 volts, the nominal threshold of the gates. A zener diode 55 protects the MOSFET 53 from voltage spikes while resistor 57 limits current drawn by any spikes.

In some cases, it is required that the microcomputers in the system be able to determine the operating status of the logic units 39. For these cases, a status circuit 59 is provided as shown in FIG. 5. This circuit converts the stream of pulses to a maintained logic level by means of a one-shot multivibrator 61. The one-shot 61 is connected so that it is retriggerable and has a time out of approximately 500 microsecond. This will allow for one pulse in a 5 KHz pulse signal to be "missed" without providing a false indication. A ligth emitting diode 63 provides a visual indication of the status of the logic unit and is turned on when a pulse signal is being generated at the output of the current amplifier 51. An isolated status signal is generated through opto-isolator 65 so that any failures in the reading circuits cannot affect the performance of the logic unit 39.

Thus far, the circuitry to reconstruct input current pulses at the output has been discussed. The circuit for the input coil 33 itself simply consists of a current limiting resistor 67 connecting the ● terminal of the coil to the +15 volt supply with the other terminal being connected to the current sinking output of the previous stage of the pulse generator. The normal operating condition is taken to be the logic state in which a continuous stream of pulses exists and the "tripped" state corresponds to that stream of pulses being blocked or removed (by removing the d-c current from the control coil). A string of basic logic units connected in a "series" fashion will provide a logic "OR" function, i.e., a trip signal at any stage will cause the output of the last stage to be in the logically "tripped" state (no pulses).

Any logic function can be represented as a combination of AND's, OR's and inversions. The "AND" function can be implemented by the control coil circuit 41 of the basic logic unit shown in FIG. 5. It was described earlier how the coil 35 effectively "permits" pulses to pass through the magnetic core when there is current flowing in the coil, and "blocks" those pulses when there is no current. To make an "AND" logic, multiple current paths 69, 71 and 73 are provided for the coil current, each of which conducts when the corresponding input is in the false (not tripped) state. Grounding any one or more of the AND inputs in this circuit allows current to flow from the voltage source, through the jumper 75 and current limiting resistor 77 into the ▲ terminal of coil 35. Diodes 79 and 81 prevent reverse flow of current between the AND inputs. to provide the inversion function, a path to shunt the current around the coil 35 is shown in FIG. 5. When the INV input is grounded, the current that had been flowing through the control coil 35 instead flows through diode 83 and jumper 85 to the INV input, thus causing the magnetic core 31 to block the input current pulses. To ensure that the current is completely diverted from the coil 35, a 2 volt zener diode 87 is provided to establish the potential of the ● terminal of coil 35 above ground potential so that the ▲ terminal can be pulled down to a lower potential than that of the ● terminal, even through a diode and transistor. For this purpose, an external jumper must be provided between the on board terminal 89 connected to zener 87 and control path 73. In an alternative arrangement of the control circuit 41, the jumpers 75 and 85 can be replaced by a jumper 91 to allow the voltage for energizing the control coil 35 to come from some external source.

In practice, a number of the basic logic units 39, typically four core/amplifier circuits, two of which include status circuits 59, are provided on a single printed circuit (PC) card. All inputs, controls and outputs are brought out to the card edge connectors and connections between the circuits are made on the card cage back plane.

Figure 6:
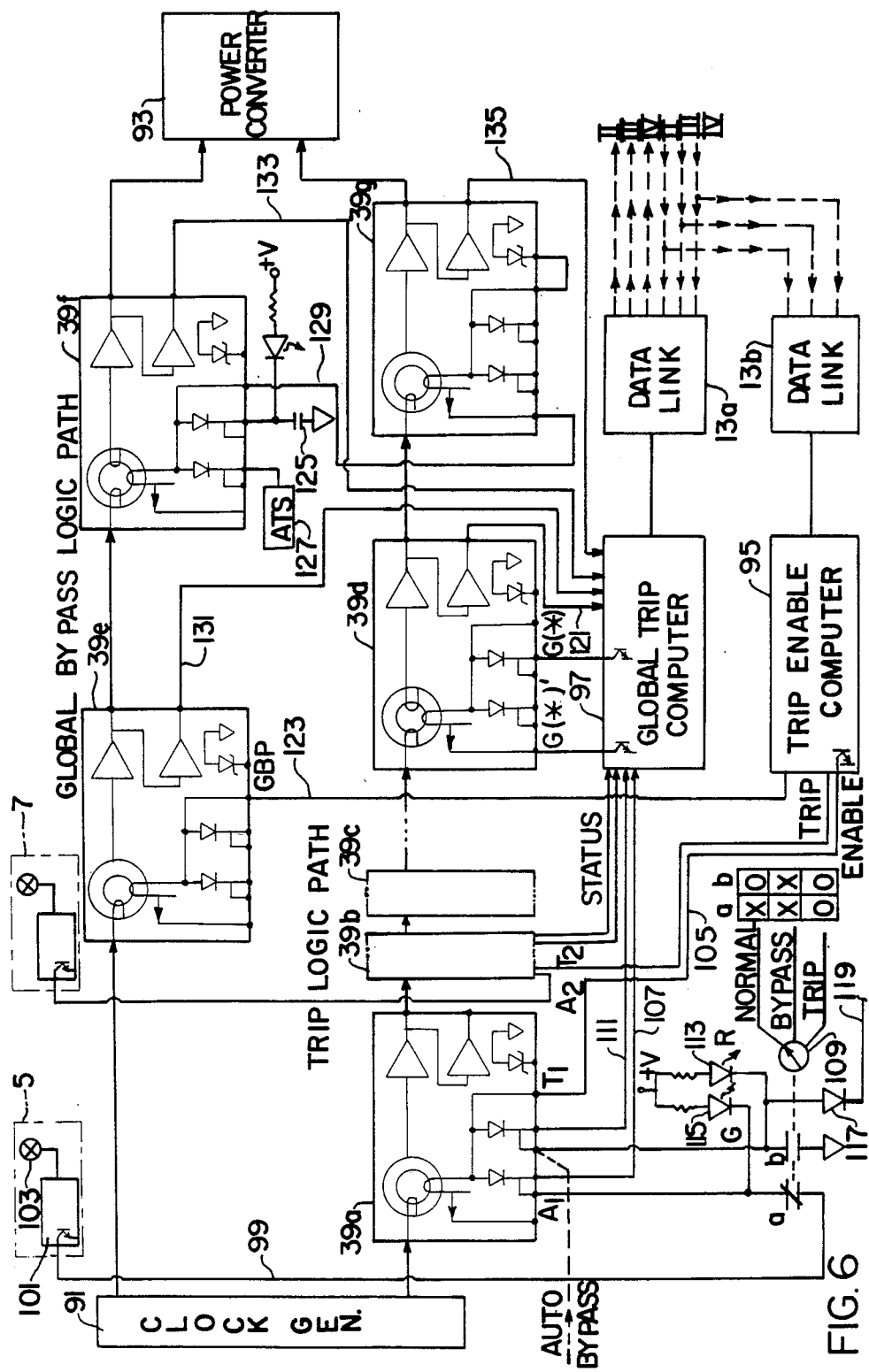
FIG. 6 is a schematic diagram of one of the channels of the protection system shown in FIG. 1 which incorporates a number of the basic logic units illustrated in FIG. 5.

FIG. 6 illustrates how the basic logic units 39 are integrated with other equipment to form one of the protection channels 11 shown in FIG. 1. In each channel, a clock generator 91 generates a continuous stream of pulses. These pulses pass by two paths, the trip logic path and the global bypass logic path, to the input of a power converter 93. The pulses may be blocked in either or both of the paths, thus preventing them from arriving at the power converter. In fact, the design is such that only one of the two paths is conducting at any given time, however, both may be blocking. The power converter 93 uses the pulse stream at its inputs to control the reactor trip (RT) switchgear. The design of the converter 93 is such that if there are no pulses at either input, the switchgear is tripped. In normal plant operation, the pulses are routed through the trip logic path and blocked in the global bypass logic leg. If plant conditions require that the reactor be tripped, then the Trip Enable and Global Trip computers 95 and 97 respectively, which also form part of the protection channel, as well as other subsystems of the overall plant protection system, act upon the trip logic path to cause it to block the pulses to the power converter 93, ultimately leading to the tripping of the RT switchgear. During the automatic test of the protection system, and also for maintenance, the pulses are routed through the global bypass logic leg thus rendering the trip logic path incapable of opening the RT switchgear. Interlocks are provided, through the bypass logic, to ensure that sufficient protection capabilities are alway maintained through the unbypassed protection channels.

To understand the design of the trip logic, it is helpful to consider the following boolean formula for two-out-of-four (2/4) coincidence logic:

$$L(2/4)[Ai,Bi,Ci,Di] = Ai \cdot Bi + Ai \cdot Ci + Ai \cdot Di + Bi \cdot Ci + Bi \cdot Di + Ci \cdot Di \quad \text{(Equation 1)}$$

In this relation, the capital letters represent the partial trip signals for the i-th trip function parameter (e.g. high system pressure) and the "·" and "+" represent the logic AND and OR operators, respectively. If "A" represents the partial trip signal in the channel being considered, then the above equation can be rearranged thusly:

$$L(2/4)[Ai,Bi,Ci,Di] = Ai \cdot (Bi + Ci + Di) + (Bi \cdot Ci + Bi \cdot Di + Ci \cdot Di) = Ai \cdot Ti + Gi \quad \text{(Equation 2)}$$

The latter form of the equation groups the partial trip signals from the other channel sets for convenience. The term T is defined as the Trip Enable signal and the term G is defined as the Global Trip. Since there are multiple functional parameters that can trip the reactor, the overall trip logic function is defined by the equation:

$$RT = A1 \cdot T1 + G1 + A2 \cdot T2 + G2 + \ldots + An \cdot Tn + Gn = A1 \cdot T1 + A2 \cdot T2 + \ldots + An \cdot Tn + G(*)$$

Where: G(*) is the logical sum of all Gi (Equation 3).

This logic equation 3 is implemented by the basic logic units 39 which are connected in series to form the "trip logic path" shown in FIG. 6. For clarity of the presentation, the basic logic units 39 are for the most part illustrated in simplified schematic form with some units, 39b and c, shown in abbreviated form due to space limitations. The A, T and G (*) signals which are applied to the control circuits of the several basic logic units 39 are normally low impedance, current sinking outputs of either microcomputer input-output cards, or bistable or logic cards. In the "tripped" state, they go to the high impedance, current blocking state.

The A1 partial trip input for the 39a logic unit which is applied through line 99 is generated for example, by the output transistor of a processor 101 which together with transducer 103 forms the sensor 5 shown in FIG. 1. The processor 101 for instance, compares the output of the transducer 103 with selected limits and generates an output which is low when the parameter is within limits and high when it is out of limits. The T1 trip enable input for logic unit 39a, which is applied through line 105 and is an indication of whether or not there is a partial trip signal for that same parameter in one of the other protection channels, is generated in the trip enable computer 95 from data collected from the other channels through data link unit 13b.

This basic logic unit 39a then performs the two out of four trip logic on the first monitored parameter since in the absence of a partial trip for that parameter in another channel, the T1 input will be low to prevent blocking of the pulse signal through logic unit 39a even if the signal A1 is in the "trip" state. Even so, the partial trip status of the signal A1 is reported to the global trip computer 97 through line 107 and is transmitted to the other channels through data link 13a where it generates a trip enable signal for that parameter in those other channels. Thus, when a corresponding partial trip occurs in another channel, both that channel and the channel of FIG. 6 will be blocked to trip their respective trip switchgear so that, as explained in connection with FIG. 1, the reactor will be tripped. A trip enable signal is also generated by the Trip Enable Computer 95 if any of the corresponding parameters in two out of three of the other channels are in bypass. This permits the logic unit 39a to trip the channel on partial trip signal alone to implement the one out of two logic for the two remaining unbypassed channels. The other A-T logic units, such as 39b and c, operate in a similar manner for the respective monitored parameters.

The parameter level, or local bypass, is implemented, in part by the Trip Enable Computer 95 and Global Trip Computer 97, and in part by hard circuitry which includes the three position switch 109. As indicated, the three positions are "Normal", "Bypass" and "Trip" and the state of the two switch contacts, "a" and "b", for each switch position is indicated in the legend next to the switch. In the "Normal" position, the partial trip signal A1 is connected through the "a" contact to one of the AND inputs of the basic logic unit 39a which then operates in the manner discussed above. In the "Bypass" position, the "b" contact of the switch grounds and AND input to the logic unit, thus blocking the A·T function and bypassing the associated parameter. The status of the local bypass is sent ot the Global Trip Computer 97 on line 111 for transmission to the other channels along with the partial trip status. This status is sensed through double contacts on the logic unit PC card so that a missing card would be immediately detected by the sense of the partial trip signal. The bypass status is also indicated by an LED 113 next to the switch 109 which is turned on when the switch is in "bypass". A second LED 115 is illuminated as long as there is no partial trip indication. Some parameters such as the DNBR (departure from nucleant boiling) Trip, require an automatic actuation of the local bypass which is connected as shown in dashed line. Since the DNBR trip for each channel of the protection systems is calculated from conditions existing in one loop of the nuclear steam supply system of a PWR and that loop may be out of service, the automatic bypass permits the associated basic logic unit to be bypassed remotely. Finally, a connection is made through a diode 117 to a "Bypass Test Bus" which is grounded momentarily by an automatic tester (not shown) in the course of its test sequence. This allows the tester to verify that all local bypasses can be sensed. Each of the other A·T basic logic units in the trip logic path are bypassed in a similar manner.

The G(*) function of equation 3 is implemented by the basic logic unit 39d in FIG. 6. This global trip signal is generated by the Global Trip Computer 95 and is sent to the logic unit 39d in two inverse logic senses with the inversion being carried out by the computer. The high impedance on trip signal G(*) is connected to an AND input (with a diode) on logic unit 39d and the low impedance on trip signal G(*)' is connected to the inverting INV input. This provides some redundancy for this function since failure of either output transistor in the global trip computer output will not prevent implementation of a global trip. As will be appreciated from examination of the boolean equations, this global trip signal is an indication that there is a coincidence of at least 2 partial trip signals for a given parameter in the other three channels. The global trip signals then trip the remaining channels to provide a redundancy that assures that the reactor is shutdown. The Global Trip Computer 95 also generates a global trip signal to block pulses in the logic unit 39d if there are two out of four bypasses in coincidence with one out of two partial trips in the remaining channels or if there are three out of four bypasses for any parameter. Since the logic unit 39d is the last unit in the trip logic path, its output defines the condition of the trip logic path. Accordingly, its status is reported to the global trip computer through line 121. The status of the trip logic path is also transmitted to the automatic tester (not shown) so that the effects of the test sequence on the trip logic can be evaluated.

The other path for pulses from the clock generator 91 to the converter 93 in the protection channel of FIG. 6 is by way of the global bypass logic leg. This leg is also made from the Basic Logic Units 39. In normal operation, the path of pulses through this leg is blocked. When a global bypass is applied, either manually via a switch on the bypass panel or automatically by the Automatic Test Subsystem, this path conducts the pulses to the power converter and simultaneously blocks the trip logic path. If permissive conditions do not allow the global bypass to be applied, i.e. a similar bypass already exists in another channel, then the global bypass logic leg is blocked by the action of the Global Bypass Permissive (GBP) signal. This condition causes both paths to be blocked and the reactor trip breakers for this channel to be tripped open. This action, together with the modification of the trip enable signal discussed above, implements the one out of two logic which is applied when two channels have been bypassed. By opening the reactor trip breakers on the second bypassed channel, a trip signal in either of the remaining channels will shut down the reactor.

The global bypass logic path is made up of three basic logic units 39e, f and g. Logic unit 39e permits the clock pulses to pass through to logic unit 39f if the Global Bypass Permissive (GBP) signal remains low, i.e. no other bypasses exist. This GBP signal is generated by the Trip Enable Computer 95 from data gathered from the other channels and is applied to an AND input of logic unit 39e through line 123. The GBP signal goes high to block the flow of pulses through logic unit 39e if the Trip Enable Computer 95 determines that another channel has been bypassed before this one or if two out of three other channels are tripping. Basic logic unit 39f passes the pulses on to the power converter 93 if a global bypass is applied, either manually through switch 125 or automatically through the automatic test system (ATS) 127, to any one of its AND inputs. The bypass is applied by a low impedance signal. This same action blocks the pulses from the trip logic path unit 39f to the inverter input of logic unit 39g. As will be understood from the discussion in connection with FIG. 5, the control winding of logic unit 39g is normally turned on by current flowing froma 15 volt supply on the logic unit PC board through the control coil and the zener diode in the control circuitry. Grounding of an AND input to the logic unit 39f by a manual or automatic test bypass signal then diverts current from the control winding of logic unit 39g through the inverter input to block the flow of trip logic pulses. The statuses of logic units 39e, f and g are sent to the Global Trip Computer 97 over lines 131, 133 and 135 respectively for use in determining the overall status of the system. In addition to performing the functions described above, the Trip Enable Computer 95 and Global Trip Computer 97 perform various checks on the messages transmitted by the data links and on their own integrity to further enhance the reliability of the system.

Figure 7:
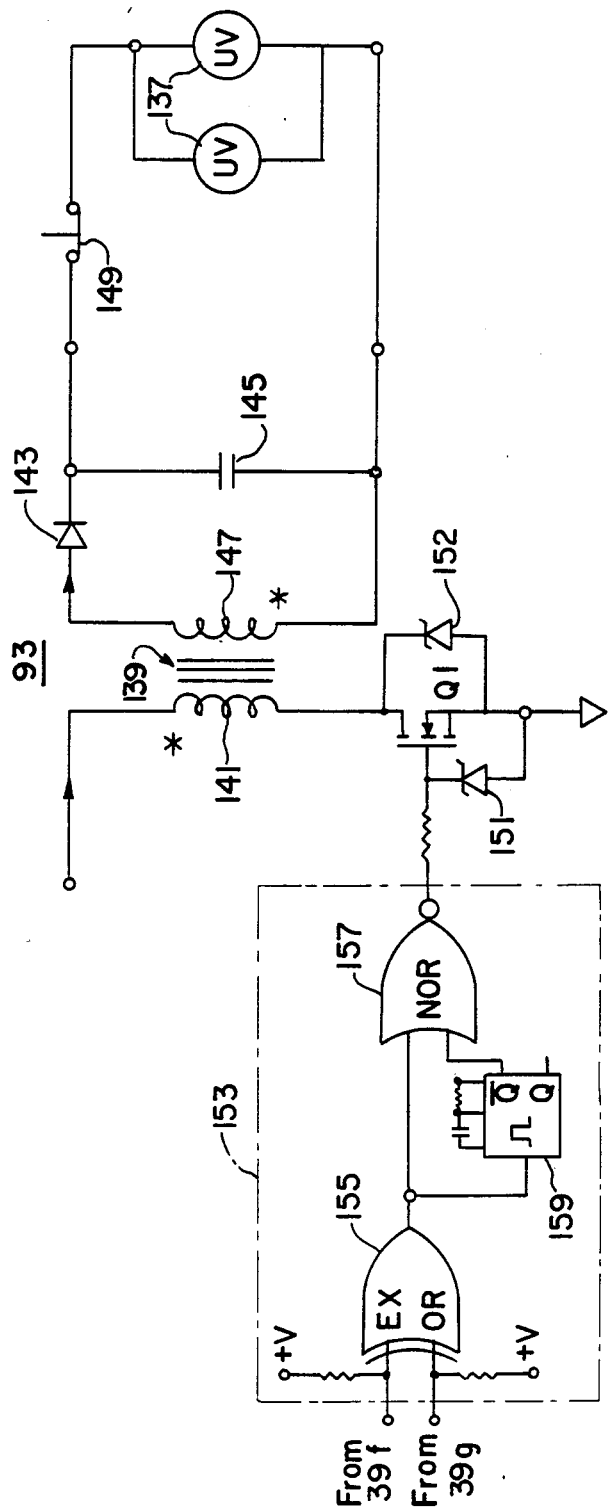
FIG. 7 is a schematic diagram of a dc-to-dc power converter which is used in the protection channel illustrated in FIG. 6.

FIG. 7 illustrates the details of the power converter 93 shown in block form in FIG. 6 and the undervoltage coils on the reactor trip switch gear which it drives. The converter utilizes the pulse stream received from the trip logic path through logic unit 39g or from the global bypass path through logic unit 39f to convert the 24 volt d-c power avilable to the protection system to the 48 volt d-c power required for the undervoltage coils 137. Each one of the undervoltage coils 137 controls one of the pair of contactors in the reactor trip switchgear 19 associated with one of the protection channels (see FIG. 1). The particular converter used is a single ended, buck-boost derived, flyback d-c to d-c power converter. The transformer 139 provides the necessary electrical isolation between the input and output ground returns. The transformer 139 in the buck-boost derived flyback converter, also serves as the inductive energy storage media. When transistor Q1 is "ON", energy is stored in the primary winding 141. During this time, diode 143 does not conduct because of the phase relationship of the secondary winding to that of the primary side. When Q1 turns "OFF", the diode 143 conducts and the energy stored in the magnetic field of the transformer 139 is released to the output filter capacitor 145 and undervoltage coil 137 via the secondary winding 147. As long as pulses are applied to the converter, sufficient output voltage is generated to maintain the undervoltage coils 137 in the energized state. Termination of the input pulse train causes the undervoltage coils to drop out thereby tripping the associated reactor trip switch gear for that channel. The operation of the switchgear can be performed manually by a switch 149. A plurality of the various protection channel switches 149 are arranged in a stack so that a single operation opens all of the reactor trip switchgear devices.

The switching transistor Q1 for the power converter is preferably a power MOSFET protected from voltage spikes during switching by zener diodes 151 and 152. Because of the absence of the second breakdown phenomenon in power MOSFETs, they are ideal switching devices for circuits which drive inductive loads such as d-c to d-c converters. The transistor Q1 is controlled by drive logic 153 which includes an exclusive OR gate 155 to which the pulses from either the trip logic path or global logic path are applied. As discussed previously, only one stream of pulses or the other is delivered to the converter, while in the trip condition both pulses streams are blocked. The output of the "EX-OR" gate 155 is connected to a NOR gate 157 directly and through a monostable 159 such as an MC14528. The monostable 159 serves a double function in this circuit: first, in normal operation, it permits the pulses from "EX-OR" gate 155 to pass through the NOR gate 157 to the gate circuit of the switching MOSFET transistor Q1; its second function is to "time-out" the NOR gate 157, when tripped, in order to leave the switching transistor Q1 in the "OFF" state (non-conducting). The monostable 159 is connected in the retriggerable mode with a rising edge trigger. It is retriggered if a valid trigger occurs, followed by another valid trigger, before its output has returend to a quiescent state. The inverting output is used, so that it is retriggered to its "low" state. The timing is set at 300 microseconds so that 5 KHz pulses coming from the logic paths hold the not "Q" output low. When the pulses are interrupted (e.g. as a result of a trip signal), the not "Q" output changes state to "High", pulling the NOR gate 157 output "low" to turn the switching transistor Q1 "OFF". This action causes the voltage on the secondary side of the transformer 139 to drop to zero and deenergize the undervoltage coils 137. Action of the monostable 159 is not required to cause the secondary voltage to drop to zero, loss of drive pulses is sufficient. However, by turning off the transistor Q1 following a trip, components are protected against excessive heating by d-c currents.

While specific embodiments of the present invention have been described in detail, it will be appreciated by those skilled in the art that various modifications and altérnatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A protection system for process apparatus comprising:
   a plurality of sensor means for generating signals representative of the state of a plurality of selected process parameters;
   clock means for generating a repetitive pulse signal;
   logic means having core means of rectangular hysteresis loop magnetic material and having input winding means, output winding means and control winding means all wound on the core means, said logic means including means for applying pulses from the clock means to the input winding means and having means connecting said sensor means to the control winding means such that with each of the parameters monitored by said sensors in a selected range, the pulses applied to the input winding means appear at the output winding means and no pulses appear at the output winding means when one of the parameters monitored is outside its selected range;
   output means connected to the output winding means of the logic means and operative to generate a first output in response to receipt of a pulse signal and to generate a second output indicative of a monitored parameter being out of its selected range when no pulse signal is received by the output means; and
   global bypass means connected between the output winding means of the logic means and the output means and to said clock means and operative in a bypass condition to apply pulses received from the clock means to the output means while blocking pulses from the output winding means of the logic means to the output means and operative in an unbypassed condition to block the application of pulses received from the clock means to the output means while permitting the passage of pulses from the output winding means of the logic means to the output means.

2. The protection system of claim 1 wherein said logic means, said global bypass means and said output means comprise a channel, wherein said plurality of sensor means include redundant sensors for each monitored parameter forming a set of sensor means, and wherein a plurality of channels are provided with one sensor means from each set connected to the control winding means of one of said channels.

3. The protection system of claim 2 wherein said global bypass means in each channel includes means responsive to another global bypass means associated with another channel which is already in a bypass condition for block in the application of pulses both from the clock means and the output winding means of the associated logic means to the associated output means when said bypass means is operated to the bypass condition.

4. The protection system of claim 3 wherein said means connecting the sensor means to the control winding means of said logic means in each channel include local bypass means associated with each sensor means which permit the pulses applied to the input winding means of the logic means to pass to the output winding means even though the parameter monitored by the sensor means is outside the selected range.

5. The protection system of claim 4 wherein each said logic means comprises a series of logic units each of which comprises a core of rectangular hysteresis loop material wound with an input winding, an output winding and a control winding with the input winding of each successive logic unit connected to the output winding of the preceding logic unit, said means connecting the sensor means to the control winding means comprising means which connect each sensor means to the control winding on one of said logic units such that when the associated parameter is within the selected range, pulses applied to the input of the logic unit appear at the output winding and when the monitored parameter is out of the selected range, no pulses appear at the output winding, and said local bypass means including means associated with each of said logic units which permit pulses applied to the input winding to appear at the output winding even though the parameter monitored by the associated sensor means is out of the selected range.

6. The protection system of claim 5 wherein said global bypass means for each channel includes a first logic unit connected between the clock means and the output means, a second said logic unit connected between the output winding of the last logic unit in said series and said output means and means connected to the control winding of said first and second logic unit to the output means and to block the flow of pulses through said second logic unit from said series of logic units to said output means, and to condition said first and second logic units to the unbypassed condition to block the flow of pulses from the clock through the first logic unit and to permit the flow of pulses through the second logic unit from said series of logic units to the output means.

7. The protection system of claim 6 wherein said global bypass means for each channel includes a third logic unit connected in series with said first logic unit and wherein said means responsive to another global bypass means associated with another channel which is already in a bypass condition is connected to the control winding of said third logic unit to block the flow of clock pulses to the output means when said first and second logic units are conditioned to the bypass condition.

8. Apparatus for selectively energizing the undervoltage coils on the trip switchgear of a nuclear power plant, said apparatus comprising:

a plurality of logic units each comprising a single core of a rectangular hysteresis loop magnetic material having a single magnetic flux path, an input winding, and an output winding only in addition to a control winding all wound on said core such that with a d-c current applied to the control winding of sufficient magnitude to saturate the core in one direction, pulses applied to the input winding which are of sufficient magnitude to saturate the core in the opposite direction, generate pulses on the output winding while the absence of current thorough the control winding results in the core remaining saturated in said opposite direction to block pulses applied to the input winding from appearing on the output winding, said logic unit including means for applying a d-c power source to one side of the control winding;

means connecting said plurality of logic units in series to form a train of logic units with the input winding of each successive logic unit connected to the output winding of the preceding unit;

clock means for applying a repetitive pulse signal to the input winding of the first logic unit;

a plurality of sensor means each of which monitors a given process parameter and generates a sensor signal having a first condition when the parameter is within a selected range and a second trip condition when the parameter is out of the selected range;

a plurality of local bypass means selectively operative to generate a local bypass signal having a first bypass condition and a second not bypassed condition;

switch means connected to the second side of the control winding on each of said logic units and to a sensor means and a local bypass means and operative to a closed position in response to a signal in the first condition from either the associated sensor means or the local bypass means to complete a circuit between the control winding and the d-c power source so that current flows through the associated control winding to permit pulses applied to the input winding to appear at the output winding of the logic unit and said switch means being operative in response to a signal in the second condition from both the sensor means and the local bypass means to an open position which deenergizes the control winding to block the passage of pulses from the input to the output winding of the logic unit; and output means connected between the output winding of said last logic unit in the series and the reactor trip switchgear and operative to prevent a trip of the switchgear so long as the output means receives pulses and to-trip the switch gear in the absence of pulses, whereby when any one of the monitored process parameters is out of its selected range, the pulse signal is interrupted to trip the trip switchgear unless the local bypass signal is generated to effect a bypass of the affected sensor means.

9. The apparatus of claim 8 wherein each logic unit includes pulse discriminator-shaper means connected to the output winding to form the output of the logic unit and which is responsive only to pulses generated by a change influx in the magnetic core from saturation in either direction to saturation in the other direction and which shapes said pulses into a pulse having a magnitude, duration and shape similar to that of the pulse applied to the input winding of the logic unit, such that a pulse signal similar to that applied by the clock means to the input winding of the first logic unit is propagated through the series of logic units.

10. The apparatus of claim 9 wherein the output means includes dc-to-dc power converter means which converts the applied pulse signal to a dc output signal of sufficient magnitude to energize the undervoltage coils of reactor trip switchgear to preclude a trip and which deenergizes the undervoltage coils to trip the reactor trip switchgear in the absence of an applied pulse signal.

11. The apparatus of claim 10 wherein the dc-to-dc power converter means includes a buck boost derived, flyback dc-to-dc power converter.

12. The apparatus of claim 10 including global bypass means comprising a first additional logic unit connected between said clock means and the output means in parallel with said train of logic units, and global bypass control means including switch means connected to the second side of the control winding of said first additional logic unit which switch is normally open to block the flow of pulses through the first additional logic unit but which closes in response to a global bypass signal to energize said control winding so that clock pulses applied to the input winding are passed through to said output means, said global bypass control means also including means which at the same time blocks the flow of pulses from the output of said train of logic units to the output means so that all of the logic units in said train are bypassed.

13. The apparatus of claim 12 wherein said global bypass control means includes a second additional logic unit connected between the output of said train of logic units and the output means, and interlocking means which ensure that the control winding of only one of said first and second additional logic units is energized at any time.

14. The apparatus of claim 13 wherein the switch means on the second side of the control winding on the first additional logic unit connects the second side of the winding to ground when the switch is closed to complete an energizing circuit for the coil and permit clock pulses to pass through the first additional logic unit to the output means, and wherein the interlock means includes an electrical lead connected between the first side of the control coil on the second additional logic unit and the secon side of said control winding on the first additional logic unit such taht when said switch on the first additional logic unit is closed to energize the control winding on the first additional logic unit, the control winding on the second additional logic unit is shorted out to block the flow of pulses from the output of the channel of logic units to the output means.

15. The apparatus of claim 14 wherein said train of logic units, said switch means, said local bypass means, said global bypass means and said output means form a channel, wherein said plurality of sensor means includes redundant sensor means for each monitored parameter forming a set of sensor means, and wherein a plurality of channels are provided withone sensor means from each set connected to the switch means for the control winding on a logic unit in one of said channels.

16. The apparatus of claim 15 wherein said global bypass means in each channel includes a third additional logic unit between said clock means and the first additional logic unit, each said channel also including computing means responsive to the condition of the global bypass means in the other channels for controlling the switch means controlling the flow of current in the control winding of said third additional logic unit, said computing means normally holding said switch closed so that pulses from the clock pass through the third additional logic unit to the first additional logic unit but opening said switch when the global bypass means of a selected number of other channels are already in a bypass condition.

17. The apparatus of claim 16 wherein said computing means in each channel is responsive to the condition of the sensor signals and bypass signals from each of the other channels and is operative to generate a trip enable signal having an enable condition and a disable condition for each of the logic units in the train based thereon, and wherein said switch means associated with the control winding in each logic unit in the train is responsive to the trip enable signal to deenergize the associated control winding when the sensor signal is in the second trip condition and the trip enable signal is in the enable condition and to keep the control winding energized despite the partial trip condition of the sensor signal when the trip enable signal is not in the enable condition.

18. The apparatus of claim 17 wherein said switch means associated with the control winding in each logic unit comprises a sensor switch which is controlled by the sensor signal and is closed when the sensor signal is in the first condition and open when it is in the second trip condition, a local bypass switch which is controlled by the local bypass signal and is closed when the local bypass signal is in the first bypass condition and closed when it is in the second unbypassed condition, and a trip enable switch which is controlled by the trip enable signal and is open when the trip enable signal is in the enable conditionand is closed when it is not in the enable condition, said switches being in parallel such that the control winding of the logic unit is energized when any of said switches is closed.

19. A modular logic unit for use with control switches having current sinking and current blocking states, said unit comprising:

a logic switch including a single core of rectangular hysteresis loop magnetic material having a single magnetic flux path and an input winding, and an output winding only in addition to a control winding all wound on said core such that with a d-c current applied to the control winding of sufficient magnitude to saturate the core in one direction, pulses applied to the input winding which are of sufficient magnitude to saturate the core in one direction, pulses applied to the input winding which are of sufficient magnitude to saturate the core in the opposite direction, generate pulses on the output winding while the absence of current through the control winding results in the core remaining saturated in said opposite direction to block pulses applied to the input winding from appearing on the output winding;

pulse discriminator-shaper means connected to the output winding of the logic switch means to form the output of the modular logic unit and responsive only to pulses from the output winding generated by a change in flux in the magnetic core form saturation in either direction to saturation in the other direction and which shapes the pulses appearing on the output winding into pulses having a duration and shape similar to that of the pulse applied to the input winding of said logic switch means; and a control circuit for the control winding of said logic switch, including a d-c current source connected to one side of said control winding , and a plurality of leads each connected to the other side of the control winding, and each having therein a control switch , such that with any one of said control switches in the current sinking state a circuit is completed for energization of the control winding and pulses applied to the input coil of said switch will generate pulses of similar duration and shape at the output of said logic unit, but no pulses appear at the output of said logic unit when all of said control switches are in the current blocking state.

20. The modular logic unit of claim 19 including an additional lead connected between said current source and said one side of said control winding of the logic switch and to which an additional control switch is connected such that with said additional control switch in the current sinking state current from the current source is diverted through said addtional lead instead of through said control winding whereby said additional lead serves as an inverter input for said modular logic unit.

21. The modular logic unit of claim 20 including a diode connected in said additional lead such that current can only flow toward said additional control switch, said combination including another lead connected to said other side of the control winding of the logic switch and to a ground and having a zener diode connected therein for holding the second side of said control winding at a higher potential than the first side thereof to assure that current does not flow through the control winding when the additional control switch is in the current sinking state.

* * * * *